(12) United States Patent
Jones et al.

(10) Patent No.: US 6,744,330 B1
(45) Date of Patent: Jun. 1, 2004

(54) ADAPTIVE ANALOG EQUALIZER

(75) Inventors: William W. Jones, San Diego, CA (US); Shrenik Pamana Patravali, San Diego, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 73 days.

(21) Appl. No.: 10/078,524

(22) Filed: Feb. 21, 2002

(51) Int. Cl.$^7$ ............................ H03H 5/00; H03G 11/04
(52) U.S. Cl. ...................................... 333/28 R; 333/18
(58) Field of Search .................................. 333/28 R, 18

(56) References Cited

U.S. PATENT DOCUMENTS

| | | | | |
|---|---|---|---|---|
| 4,669,092 A | * | 5/1987 | Sari et al. ..................... | 375/232 |
| 5,734,680 A | * | 3/1998 | Moore et al. ................. | 375/263 |
| 5,880,645 A | * | 3/1999 | Everitt et al. ................. | 333/18 |
| 5,903,605 A | * | 5/1999 | Crittenden .................... | 375/226 |
| 5,940,442 A | * | 8/1999 | Wong et al. .................. | 375/232 |
| 5,943,368 A | * | 8/1999 | Bergmans et al. ........... | 375/295 |

* cited by examiner

Primary Examiner—Patricia Nguyen
(74) Attorney, Agent, or Firm—Christopher J. Rourk; Akin Gump Strauss Hauer & Feld, LLP

(57) ABSTRACT

Adaptive analog equalization. The present invention provides an analog equalization solution that is assured to converge irrespective of the initial conditions of the adaptation. For very high frequency communication applications, including DS3 or E3 line code applications operating at frequencies approaching 45 MHz, the analog adaptive equalization employs double sampling. One of the samples is used to make the decision if a transition actually goes to zero, and the other of the samples is used to drive the adaptation loop to converge. The present invention employs a high pass network and an adaptable gain to control an adaptive analog equalizer structure. There are two different feedback paths to ensure convergence of the present invention. In one embodiment, one feedback path is the gain control feedback path that is provided to the adaptive analog equalizer structure. The other feedback path is provided to a variable gain amplifier. The analog adaptive equalizer structure employs an adaptive equalizer circuitry that has a transfer function that is essentially the inverse of a communication channel from which a signal is provided.

19 Claims, 8 Drawing Sheets

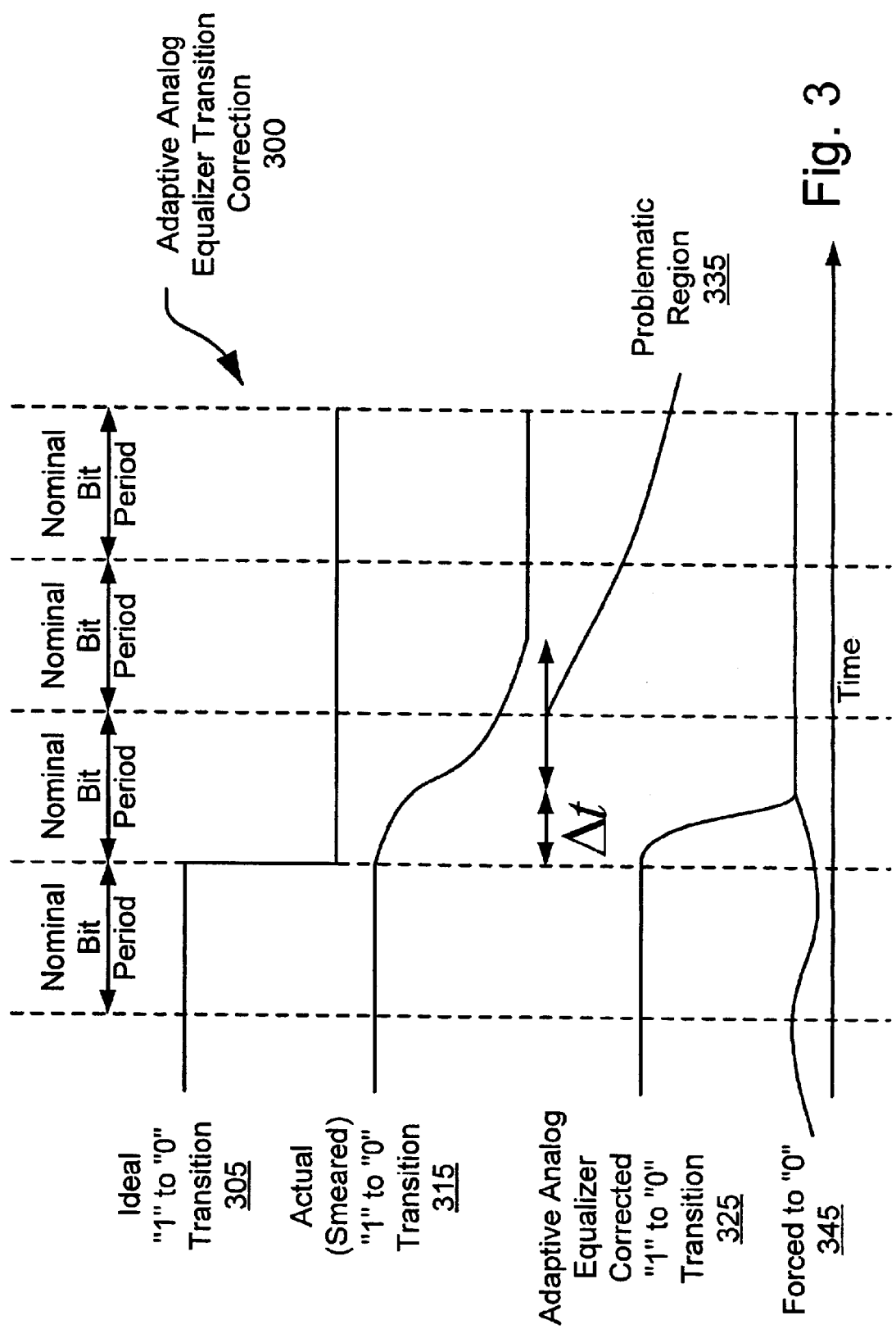

ADAPTIVE ANALOG EQUALIZER

FIELD OF THE INVENTION

The present invention relates generally to analog equalization; and, more particularly, it relates to adaptive analog equalization

RELATED ART

Existing technologies for analog equalization commonly utilize the shape of a signal pulse to drive equalization adaptation for countering the undesirable channel attenuation and distortion. These conventional techniques are effective for most "return-to-zero" AMI line codes, but for DS3 or E3 line code applications, the pulse mask is spread to the point that it can essentially be considered non-return-to-zero within the bit period. In this case, it is difficult to train the equalizer when starting from either an over-equalized condition or an under-equalized condition.

Existing analog equalization techniques commonly trigger on the rising edge of a pulse and then sample the signal some time later at the falling edge where the sampled value is expected to be close to zero. The later sampling is typically about ¾ of a symbol period later. The sampled value is an indication of the degree of over-equalization or under-equalization. This indication is used as the error term in the equalizer feedback control loop.

FIG. 1A is a system diagram illustrating an idealized adaptive analog equalization system 100A. The system in FIG. 1A is illustrative of the situation where equalization is performed at the receive end of a communication channel, somehow trying to compensate for the deleterious effects of intersymbol interference within the communication channel. An input signal 110A is passed through a communication channel 130A having a transfer function shown as H(s). The communication channel 130A is terminated by an equalizer 142A having a transfer function [~1/H(s)] that is, ideally, the inverse of the transfer function of the communication channel 130A. The output signal 112A is, ideally, an exact duplicate of the input signal 110A.

Many conventional equalization systems operate using digital correction techniques. While these digital techniques are amenable to many applications, they are simply insufficient for very high frequency applications. As the operational frequencies continue to increase within various communication systems, the conventional digital correction techniques need similarly to increase in terms of operational frequency.

Further limitations and disadvantages of conventional and traditional systems will become apparent to one of skill in the art through comparison of such systems with the present invention as set forth in the remainder of the present application with reference to the drawings.

SUMMARY OF THE INVENTION

The present invention provides an adaptive analog equalizer that operates on a received input signal. The adaptive analog equalizer includes a high pass network and a multiplier that has an adjustable gain. The high pass network and the multiplier have a frequency response that, when adaptively applied to the input signal, are operable to compensate for corruption in the input signal. The output signal from the adaptive analog equalizer is used to drive the gain control through a feedback loop to adjust the adjustable gain of the multiplier. The received input signal is modified by the high pass network and the multiplier and is then summed up with itself.

In one embodiment of the invention, the received input signal is a channel corrupted input signal. However, the adaptive analog equalizer is operable on the input signal when there is no corruption in the input signal as well without any additional complexity. When the input signal is provided from a communication channel, the frequency response of the adaptive analog equalizer is adapted to be substantially an inverse of the frequency response of the channel. The gain control performs decision and sampling control of the output signal from the adaptive analog equalizer, and feeds it back to the multiplier of the adaptive analog equalizer through an integrator. The adaptive analog equalizer requires variable gain amplification, to be performed on its input signal. The variable gain amplifier in conjunction with an integrator, and a peak detector is employed for this purpose. The output signal from the adaptive analog equalizer is processed through the peak detector and the integrator to provide a feedback control signal for the variable gain amplifier. The decision and sampling control block in the gain control circuit is operable to perform double sampling of its input signal. The decision and sampling control circuit waits a first predetermined period of time after pulse rising edge detection before sampling a first sample of the input signal. In addition, it waits a second predetermined period of time after pulse rising edge detection before sampling a second sample of the input signal.

Other features of the present invention can be found in a double sampling adaptive analog equalizer. The double sampling adaptive analog equalizer includes a decision and sampling control block inside a gain control unit that is operable to perform double sampling of an input signal. The gain-control processed feedback loop forces the input signal to a predetermined value within ¾$^{th}$ of a bit period after detecting a rising edge. The predetermined value to which the input signal is forced is zero.

In some embodiments of the invention, the decision and sampling control waits a first predetermined period of time before sampling a first sample of its input signal. In one embodiment, the first predetermined period of time is less than a pulse period. In addition, the decision and sampling control waits a second predetermined period of time before sampling a second sample of the input signal. In one embodiment, the second predetermined period of time is greater than a pulse period.

The adaptive analog equalizer structure of the present invention also includes a high pass network and a multiplier having an adjustable gain. The input signal is provided from a communication channel having a channel frequency response, and a frequency response of the high pass network and the multiplier is substantially an inverse of the channel frequency response.

Other aspects of the present invention can be found in a method to perform analog adaptive equalization. The method involves detecting a rising edge of an input signal, waiting a first predetermined period of time before sampling a first sample of the input signal, waiting a second predetermined period of time before sampling a second sample of the input signal, and adjusting a gain of a multiplier when the second sample does not exceed a predetermined threshold.

In some embodiments of the invention, the first predetermined period of time is less than a pulse period. The second predetermined period of time is greater than a pulse period. The input signal is a channel corrupted input signal. The method also involves forcing the input signal to zero within ¾$^{th}$ of a bit period in response to a one to zero transition.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE SEVERAL VIEWS OF THE DRAWINGS

The components in the figures are not necessarily to scale, emphasis instead being placed upon illustrating the principles of the invention. In the figures, like reference numerals designate corresponding parts throughout the different views.

FIG. 3 is a timing diagram illustrating adaptive analog equalizer transition correction performed in accordance with the present invention.

DETAILED DESCRIPTION OF THE INVENTION

DS3 and E3 line codes typically operate at frequencies of 45 MHz and 34 MHz, respectively. This high operation frequency is simply too high for digital equalization correction techniques to be practical. The analog to digital converters (ADCs) that would be needed in such digital equalization techniques are typically high power consumptive as well. An analog adaptive equalizer is used in the present invention to provide for effective equalization correction. Other line codes that similarly operate at high frequencies may also benefit from the adaptive analog equalization performed in accordance with the present invention. Even at those lower operational frequencies within various communication systems, the adaptive analog equalization of the invention is operable within those systems as well.

Figure 1A:
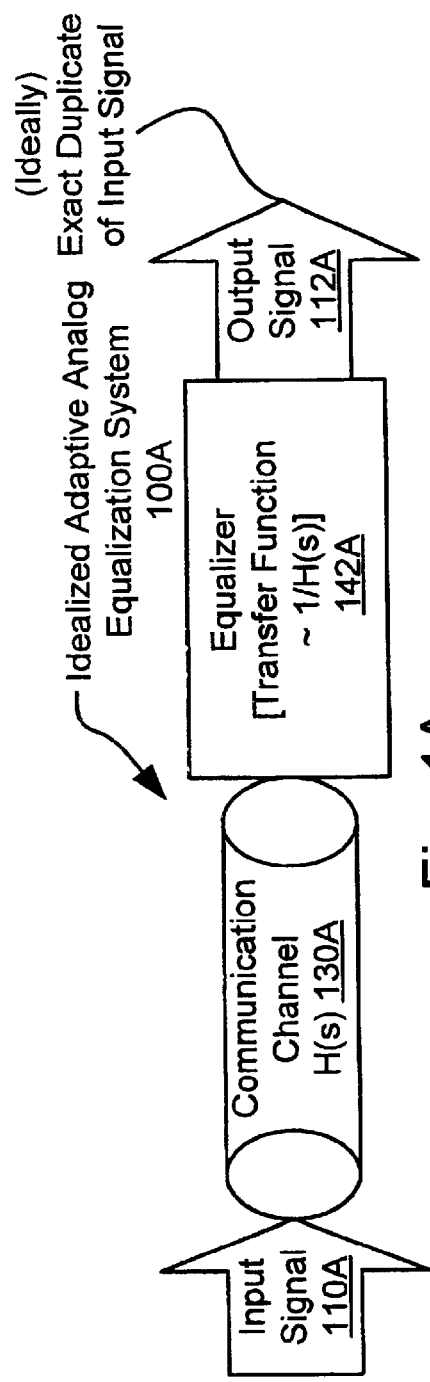
FIG. 1A is a system diagram illustrating an idealized adaptive analog equalization system 100A.
Figure 1B:
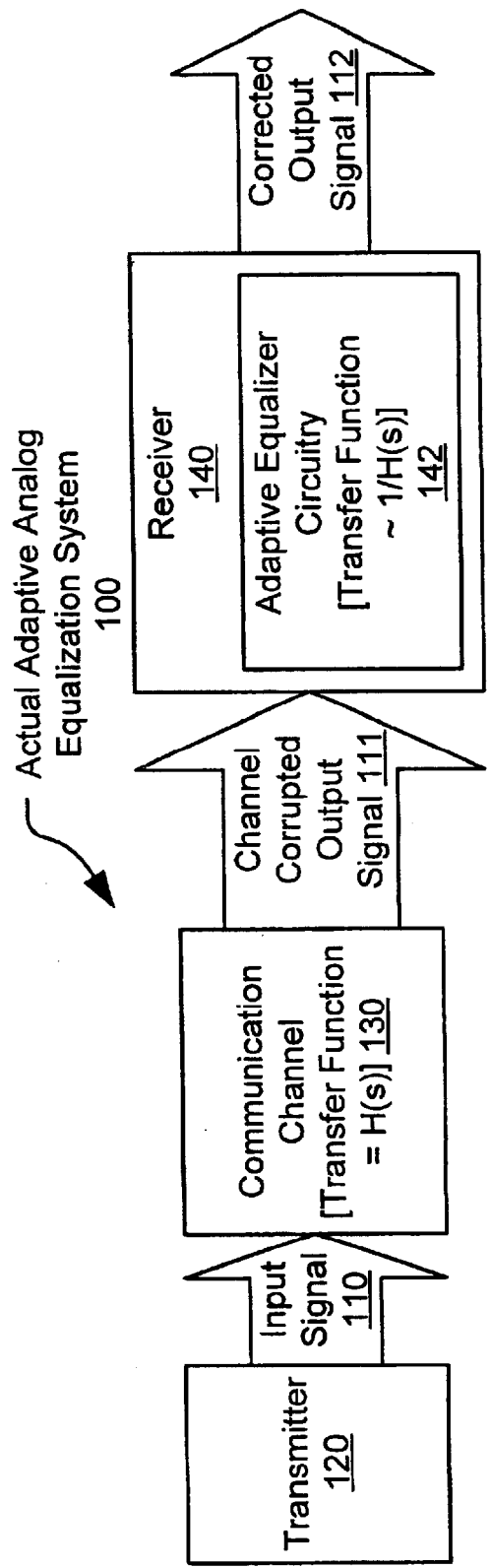
FIG. 1B is a system diagram illustrating an embodiment of an actual adaptive analog equalization system designed in accordance with the present invention.

FIG. 1B is a system diagram illustrating an embodiment of an actual adaptive analog equalization system 100 designed in accordance with the present invention. A transmitter 120 generates an input signal 110 that is passed through a communication channel 130 having a transfer function shown as H(s). The input signal 110 is then transformed into a channel corrupted output signal 111. The channel corrupted output signal 111 is then passed to a receiver 140. The receiver 140 employs an adaptive equalization circuitry 142 having a transfer function [~1/H(s)] that is substantially close to the inverse of the transfer function of the communication channel 130. The corrected output signal 112 is then substantially similar to the input signal 110A.

Figure 2A:
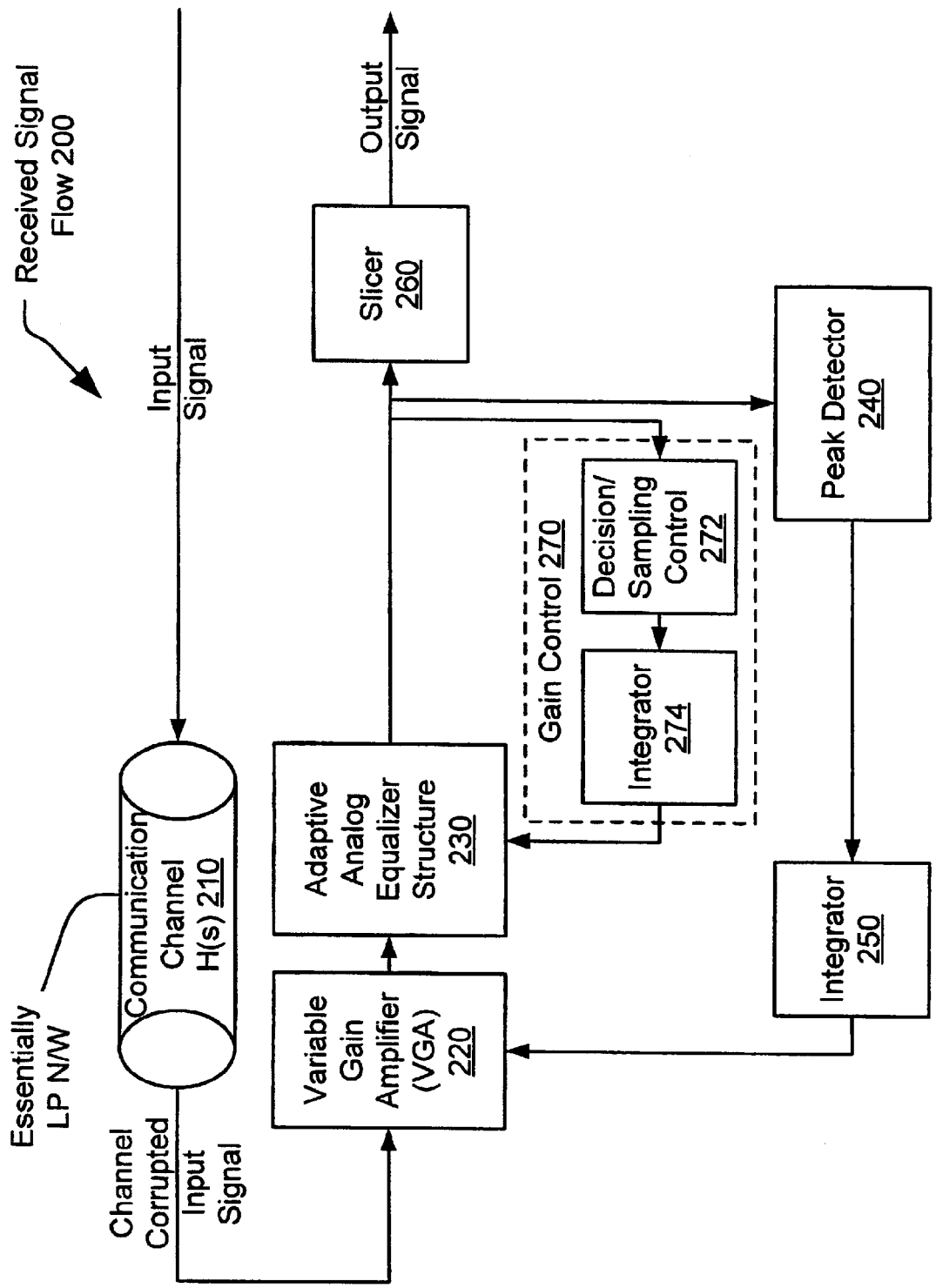
FIG. 2A is a flow diagram illustrating an embodiment of received signal flow within an adaptive analog equalization system operating in accordance with the present invention.

FIG. 2A is a flow diagram illustrating an embodiment of received signal flow 200 within an adaptive analog equalization system operating in accordance with the present invention. The received signal flow 200 shows an input signal that is provided to a communication channel 210 having a transfer function shown as H(s). The communication channel 210 is viewed as being essentially a low pass network from certain perspectives. Output from the communication channel 210 is a channel corrupted input signal that is provided to a variable gain amplifier (VGA) 220. The VGA 220 is communicatively coupled to an adaptive analog equalizer structure 230 that is itself communicatively coupled to a slicer 260. The output from the slicer 260 is shown as the output signal.

The output of the adaptive analog equalizer structure 230 is fed back through two distinct feedback control loops. One of the control loops is where the output of the adaptive analog equalizer structure 230 is fed to a peak detector 240 that itself provides an output to an integrator 250. The integrator 250 provides an output to a VGA 220. The other of the control loops is where the output of the adaptive analog equalizer structure 230 is fed to a gain control block 270. The gain control block 270 includes a decision/sampling control block 272 and an integrator 274. The output of the gain control block 270 is fed to the adaptive analog equalizer structure 230.

The received signal flow 200 shows double sampling of the output of the adaptive analog equalizer structure 230 performed in accordance with the present, invention. Two distinct samples are taken after the rising edge trigger of the signal. The first sample is operable to measure the error term. If desired, the first sample is nominally taken $\frac{3}{4}^{th}$ symbol period after the trigger. The second sample is operable to determine a one-zero (1/0) transition. If desired, the second sample is taken nominally 1 and $\frac{1}{4}^{th}$ symbol periods after the trigger. The error term is used if a one-zero (1/0) transition is detected.

The present invention is operable to ensure that the equalizer will converge regardless of the initial conditions of the adaptation. As mentioned above, the present invention is particular effective within DS3 or E3 line codes, but it is operable for any RZ pulse or on-off keying signal.

Figure 2B:
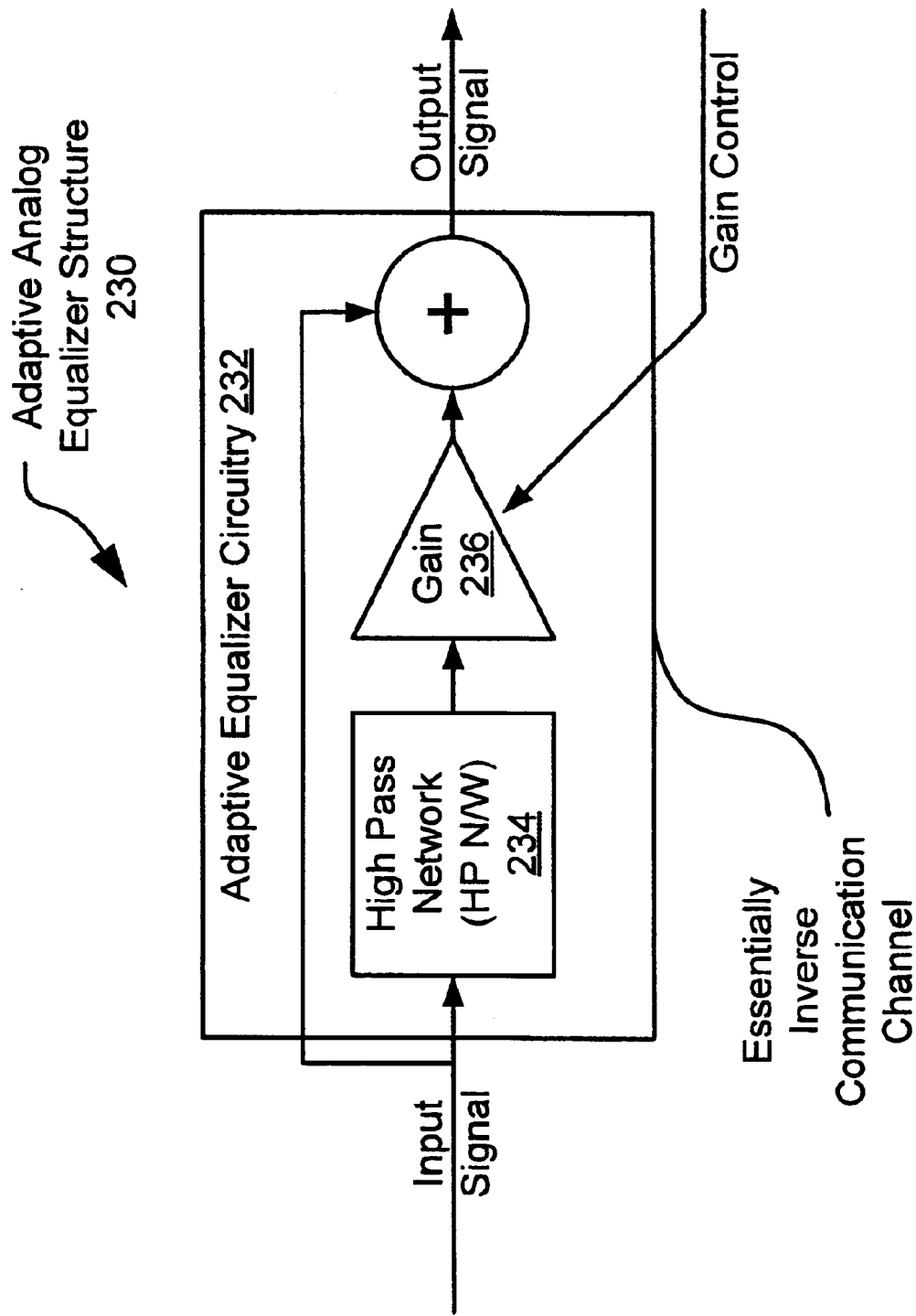
FIG. 2B is a system diagram illustrating an embodiment of an adaptive analog equalizer structure built in accordance with the present invention.

FIG. 2B is a system diagram illustrating an embodiment of an adaptive analog equalizer structure 230 built in accordance with the present invention. From certain perspectives, the adaptive analog equalizer structure 230 is viewed as being the adaptive analog equalizer structure 230 of the FIG. 2A.

The adaptive analog equalizer structure 230 of the FIG. 2B includes an 110 adaptive equalization circuitry 232 that is operable on an input signal. Using a gain control input, the input signal is modified and transformed into an output signal. The adaptive equalization circuitry 232 includes a high pass network (HP N/W) 234, an amplifier having a gain 236 and a summing junction. The adaptive equalization circuitry 232 has a transfer function that is essentially the inverse of a communication channel from which the input signal is provided.

The input signal is provided to the high pass network (HP N/W) 234 within the adaptive equalization circuitry 232 and also to the summing junction within the adaptive equalization circuitry 232. The output from the high pass network (HP N/W) 234 is passed to the amplifier having a gain 236. The gain 236 is adaptable as a function of the gain control. From certain perspectives, the gain control of the adaptive analog equalizer structure 230 is viewed as being the gain control 270 of the FIG. 2A.

FIG. 3 is a timing diagram illustrating adaptive analog equalizer transition correction 300 performed in accordance with the present invention. An ideal one to zero ("1" to "0") transition 305 shows a value of signal transitioning from a high value to a low value precisely at the junction between two nominal bit periods. However, an actual (smeared) one to zero ("1" to "0") transition 315 where the signal transitions from a high value to a low value over multiple bit periods. The "Δt" nominally shows a period during which the signal transition, if it were completely performed, would cause no problems and require no equalization correction. However, there is a problematic region 335 during which it is unclear, from a signal processing perspective, whether there has or has not been an actual transition. The problem arises when a one to zero ("1" to "0") transition has not been fully accomplished, and the next nominal bit period has a non-zero signal level, resulting in the slicer interpreting the bit as a 1 instead of a 0. The adaptive analog equalizer corrected one to zero ("1" to "0") transition 325 shows where the signal level is forced to zero "0" 345 within one nominal bit period. The problematic region 335 is existent within conventional adaptive analog equalization systems.

Figure 4:
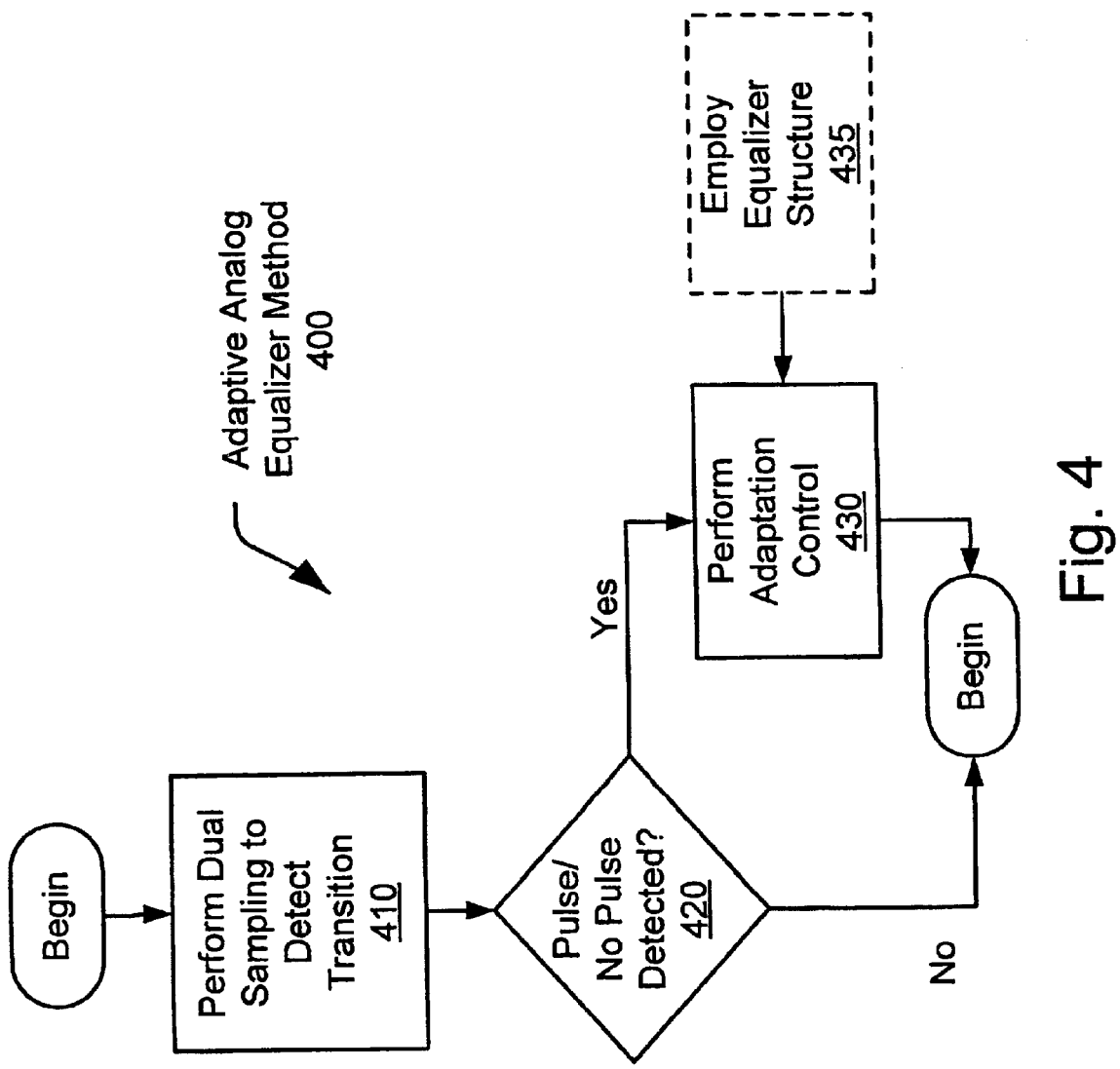
FIG. 4 is a functional block diagram illustrating an embodiment of an adaptive analog equalizer method performed in accordance with the present invention.

FIG. 4 is a functional block diagram illustrating an embodiment of an adaptive analog equalizer method 400 performed in accordance with the present invention. In, a block 410, dual sampling is performed. Then, in a decision block 420, it is determined whether a pulse to no pulse (1/0) transition has been detected. If yes, then adaptation control is performed in a block 430. An equalizer structure is employed as shown in a block 435 when performing the adaptation control in the block 430. The equalizer structure employed in the block 435 is the adaptive analog equalizer structure 230 shown in the FIGS. 2A and 2B. If no, the adaptive analog equalizer method 400 continues back to the block 410.

Figure 5:
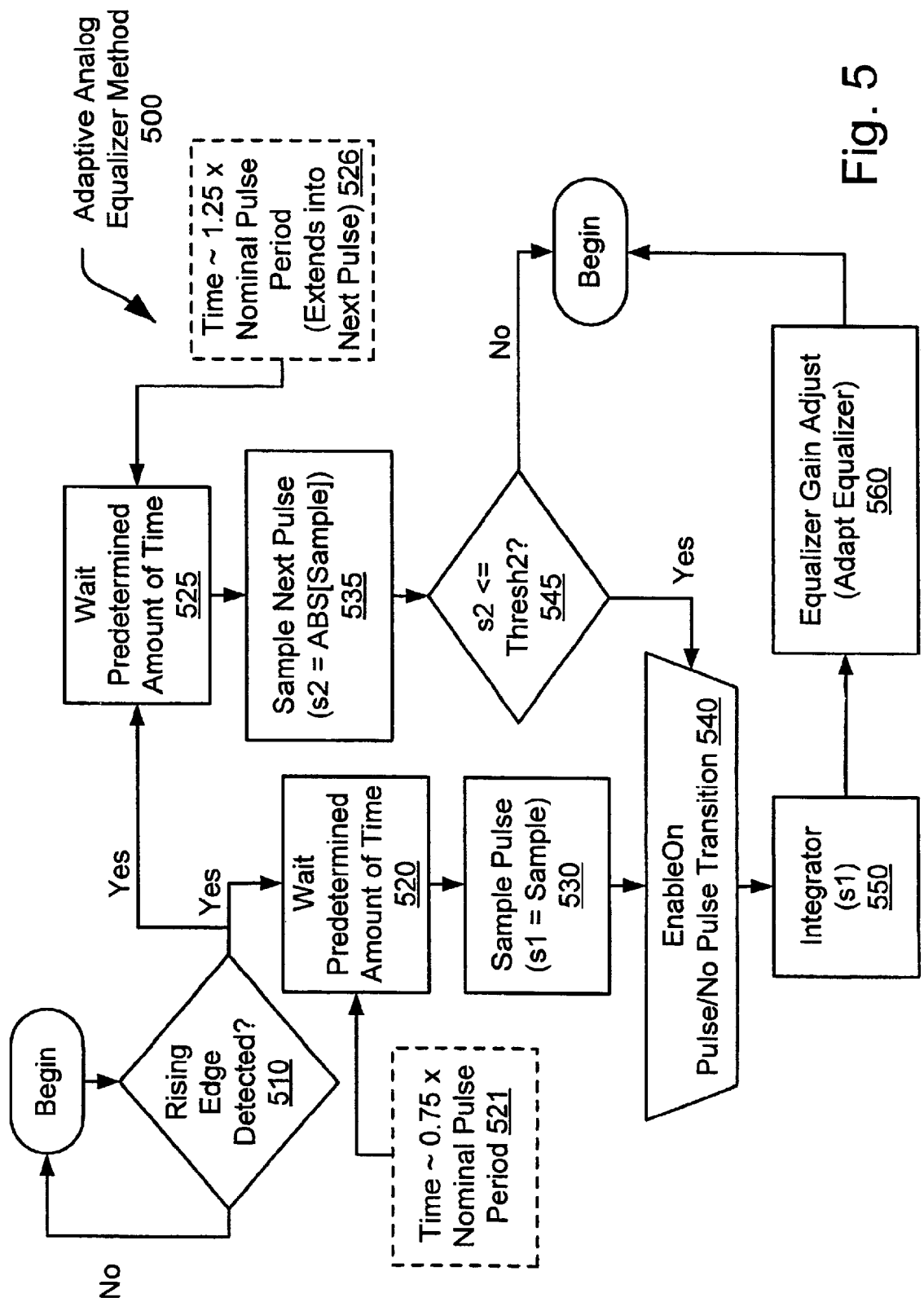
FIG. 5 is a functional block diagram illustrating another embodiment of an adaptive analog equalizer method performed in accordance with the present invention.

FIG. 5 is a functional block diagram illustrating another embodiment of an adaptive analog equalizer method 500 performed in accordance with the present invention. In a decision block 510, it is determined whether a pulse rising edge is detected. If no, then the adaptive analog equalizer method 500 returns to the decision block 510. If a rising edge is detected as determined in the decision block 510, then two different paths are taken as shown by a block 520 and a block 525.

In the block 520, the adaptive analog equalizer method 500 waits a predetermined amount of time. If desired in alternative embodiments, the time that is waited is ¾ of a nominal pulse period as shown in an alternative block 521. Then, a pulse is sampled as shown in a block 530. The value "s1" is shown as being the sample in the block 530. Then, an enableOn pulse to no pulse transition is made in a block 540.

In addition, in the block 525, the adaptive analog equalizer method 500 also waits a predetermined amount of time. If desired in alternative embodiments, the time that is waited is 1¼ of a nominal pulse period as shown in an alternative block 526. The predetermined time period extends into the next pulse as shown in the alternative block 536. Then, the next pulse is sampled as shown in a block 535. The value "s2" is shown as being the sample of the next pulse in the block 535. The sample "s2" is the absolute value of the next pulse as shown in the block 535. Then, in a decision block 545, it is determined if the sample "s2" is less than or equal to a predetermined threshold "thresh2." If no, then the adaptive analog equalizer method 500 begins and returns to the decision block 510. However, if it is determined if the sample "s2" is less than or equal to a predetermined threshold "thresh2," then it is concluded that a pulse to no pulse (1/0) transition has taken place and the adaptive analog equalizer method 500 continues to the enableOn pulse to no pulse transition as shown in the block 540. The yes decision derived from the decision block 545, feeding into the block 540, serves as a trigger to proceed to a block 550.

Subsequent to the operation in the block 540, an integrator operates on the sample "s1" as shown in the block 550. Then, an equalizer is adapted as shown in a block 560. The equalizer gain is adjusted in the block 560. The equalizer gain is that adjusted in the block 560 is the amplifier having the gain 236 in the FIG. 2B. The gain control that performs the equalizer gain adjust in the block 560 is the gain control block 270 as shown in the FIG. 2A above.

Figure 6:
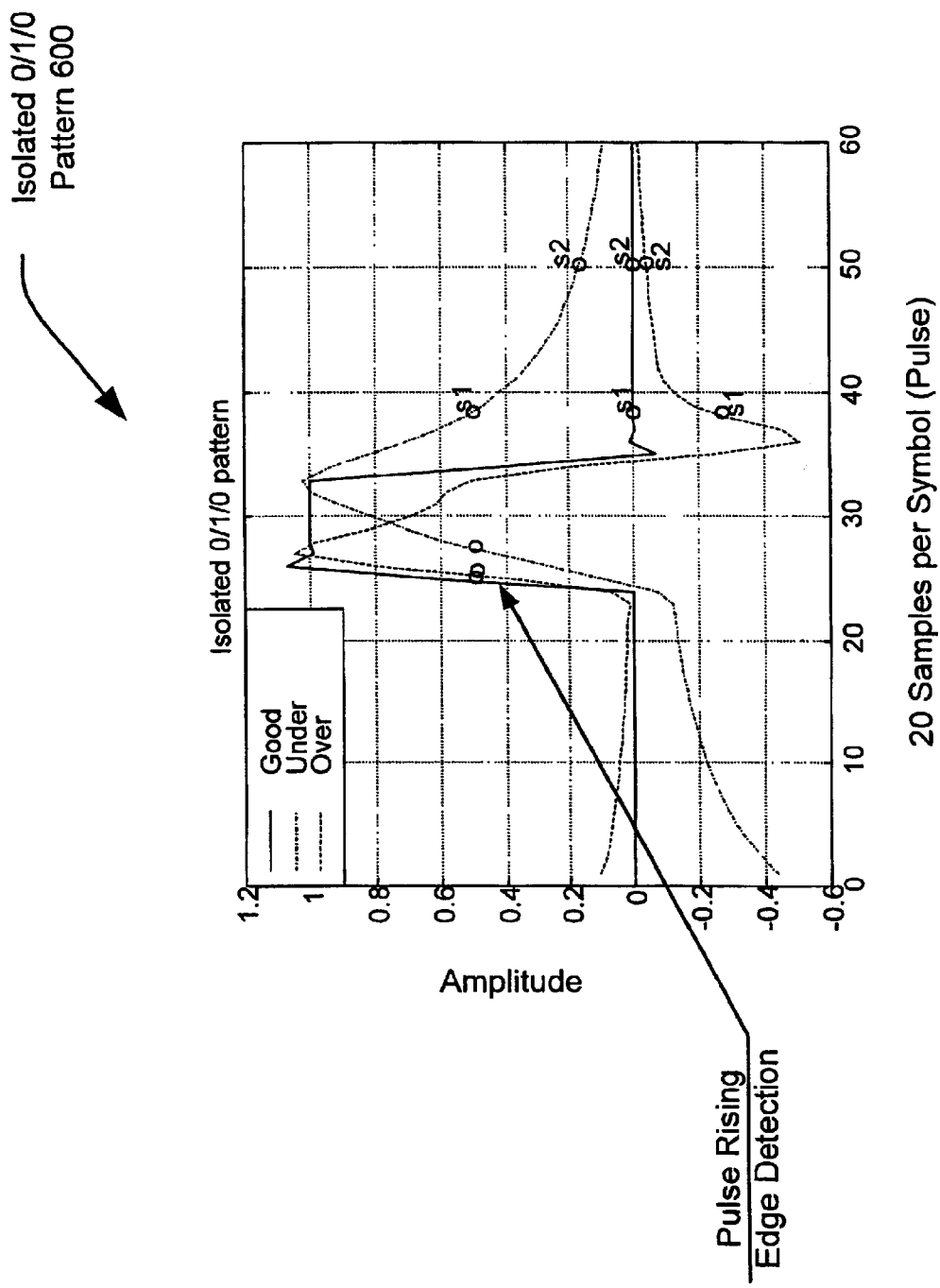
FIG. 6 is a timing diagram illustrating an isolated 0/1/0 pattern that is properly corrected using adaptive analog equalization in accordance with the present invention.

FIG. 6 is a timing diagram illustrating an isolated 0/1/0 pattern 600 that is properly corrected using adaptive analog equalization in accordance with the present invention. Pulse rising edge detection is performed on the isolated 0/1/0 pattern 600. There are three different types of equalization performed in the FIG. 6. For each of the three cases, a first sample "s1" and a second sample "s2" are made near the transition of the isolated 0/1/0 pattern 600. For an over-equalized signal, the first sample "s1" and the second sample "s2" are both negative. For both the under-equalized signal, the first sample "s1" and the second sample "s2" are both positive. For the properly equalized signal, resulting from the analog adaptive equalization performed in accordance with the present invention, both the first sample "s1" and the second sample "s2" are properly aligned close to the zero axis after performing the transition of the isolated 0/1/0 pattern 600 as shown by the solid line.

Figure 7:
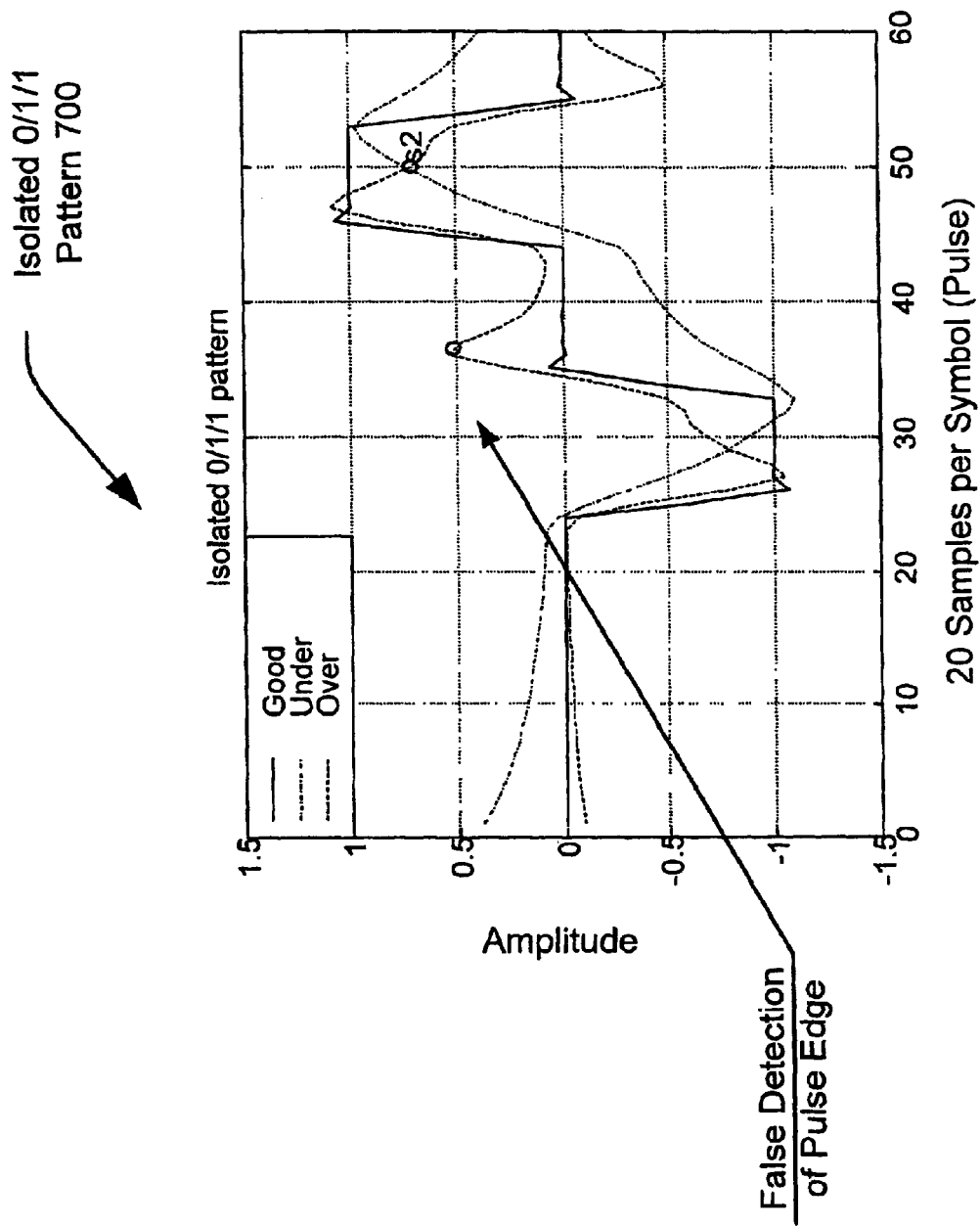
FIG. 7 is a timing diagram illustrating an isolated 0/1/1 pattern that is properly processed using adaptive analog equalization in accordance with the present invention.

FIG. 7 is a timing diagram illustrating an isolated 0/1/1 pattern 700 that is properly processed using adaptive analog equalization in accordance with the present invention. A false detection of a pulse edge is performed in those situations where over-equalization and under-equalization are performed using conventional equalization techniques.

For the properly equalized signal, resulting from the analog adaptive equalization performed in accordance with the present invention, the isolated 0/1/1 pattern 700 is shown as the solid line.

While various embodiments of the invention have been described, it will be apparent to those of ordinary skill in the art that many more embodiments and implementations are possible that are within the scope of this invention.

It is claimed:

1. An adaptive analog equalizer that operates on a signal, comprising:
a high pass network and a multiplier, the multiplier has an adjustable gain that is adjusted using gain control;
the high pass network and the multiplier have a frequency response that, when adaptively applied to an input signal, are operable to compensate for corruption in the input signal;
the gain control uses an output of the adaptive analog equalizer to adjust the adjustable gain of the multiplier;

the high pass network and the multiplier modify the input signal, the modified input signal is summed with the input signal;

wherein the gain control performs decision and sampling control of the output signal; and the gain control integrates an output signal from the decision and sampling control using an integrator.

2. The adaptive analog equalizer of claim 1, wherein the input signal comprises a channel corrupted input signal.

3. The adaptive analog equalizer of claim 1, wherein the input signal is provided from a communication channel, the communication channel having a channel frequency response; and the frequency response of the high pass network and the multiplier is substantially an inverse of the channel frequency response.

4. An adaptive analog equalizer that operates on a signal, comprising:

a high pass network and a multiplier, the multiplier has an adjustable gain that is adjusted using gain control;

the high pass network and the multiplier have a frequency response that, when adaptively applied to an input signal, are operable to compensate for corruption in the input signal;

the gain control uses an output of the adaptive analog equalizer to adjust the adjustable gain of the multiplier;

the high pass network and the multiplier modify the input signal, the modified input signal is summed with the input signal;

a variable gain amplifier, an integrator, and a peak detector; and wherein the output signal is passed through the peak detector and the integrator to provide a control signal for the variable gain amplifier.

5. The adaptive analog equalizer of claim 1, wherein the adaptive analog equalizer performs double sampling of the input signal.

6. An adaptive analog equalizer that operates on a signal, comprising:

a high pass network and a multiplier, the multiplier has an adjustable gain that is adjusted using gain control;

the high pass network and the multiplier have a frequency response that, when adaptively applied to an input signal, are operable to compensate for corruption in the input signal;

the gain control uses an output of the adaptive analog equalizer to adjust the adjustable gain of the multiplier;

the high pass network and the multiplier modify the input signal, the modified input signal is summed with the input signal;

wherein the adaptive analog equalizer waits a first predetermined period of time after detecting a pulse rising edge before sampling a first sample of the input signal; and the adaptive analog equalizer waits a second predetermined period of time after detecting the pulse rising edge before sampling a second sample of the input signal.

7. A double sampling adaptive analog equalizer, comprising:

a gain control unit comprising a decision and sampling control circuit, the decision and sampling control circuit is operable to perform double sampling of an input signal; and the gain control unit comprises a gain control processed feedback loop that forces the input signal to a predetermined value within a bit period after detecting a pulse rising edge.

8. The double sampling adaptive analog equalizer of claim 7, wherein the decision and sampling circuit waits a first predetermined period of time after detecting the pulse rising edge before sampling a first sample of the input signal.

9. The double sampling adaptive analog equalizer of claim 8, wherein the first predetermined period of time is less than a pulse period.

10. The double sampling adaptive analog equalizer of claim 7, wherein the decision and sampling circuit waits a second predetermined period of time after detecting the pulse rising edge before sampling a second sample of the input signal.

11. The double sampling adaptive analog equalizer of claim 10, wherein the second predetermined period of time is greater than a pulse period.

12. The double sampling adaptive analog equalizer of claim 7, wherein the predetermined value is zero.

13. The double sampling adaptive analog equalizer of claim 7, wherein the adaptive analog equalizer structure comprises a high pass network and a multiplier having an adjustable gain.

14. The double sampling adaptive analog equalizer of claim 13, wherein the input signal is provided from a communication channel, the communication channel having a channel frequency response; and a frequency response of the high pass network and the multiplier is substantially an inverse of the channel frequency response.

15. A method to perform analog adaptive equalization, the method comprising:

detecting a pulse rising edge of an input signal;

waiting a first predetermined period of time after detecting the pulse rising edge before sampling a first sample of the input signal;

waiting a second predetermined period of time after detecting the pulse rising edge before sampling a second sample of the input signal; and adjusting a gain of a multiplier when the second sample does not exceed a predetermined threshold.

16. The method of claim 15, wherein the first predetermined period of time is less than a pulse period.

17. The method of claim 15, wherein the second predetermined period of time is greater than a pulse period.

18. The method of claim 15, wherein the input signal comprises a channel corrupted input signal.

19. The method of claim 15, further comprising forcing the input signal to zero within a bit period after detecting the pulse rising edge in response to a one to zero transition.

* * * * *